(No Model.)
M. FREAR.
VEHICLE RUNNING GEAR.
No. 313,486. Patented Mar. 10, 1885.
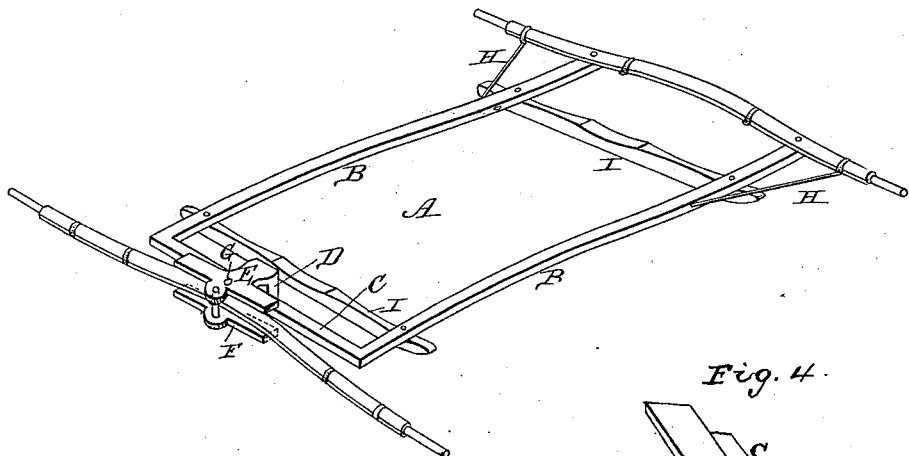
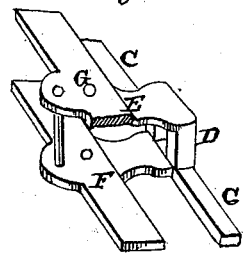
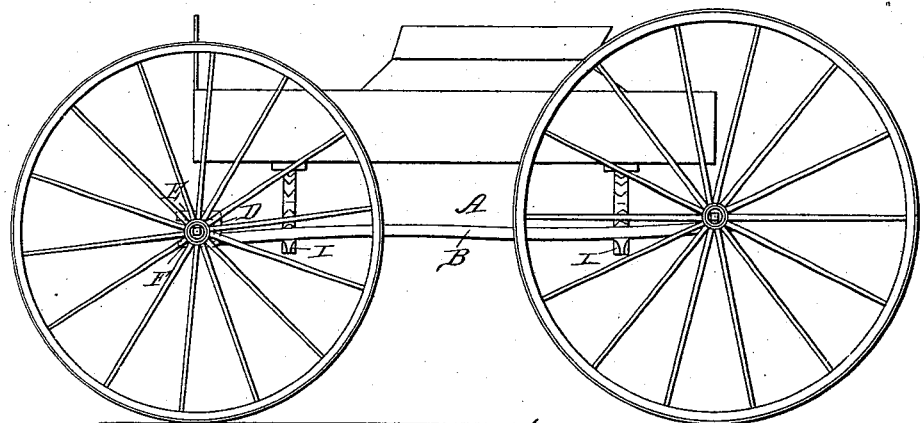
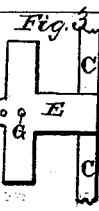
Witnesses:
J. W. Garner
Edw. Greene
Inventor:
Moses Frear,
per F. A. Lehmann,
atty.

United States Patent Office.

MOSES FREAR, OF ROSENDALE, NEW YORK, ASSIGNOR OF ONE-HALF TO RUFUS SNYDER, OF SAME PLACE.

VEHICLE RUNNING-GEAR.

SPECIFICATION forming part of Letters Patent No. 313,486, dated March 10, 1885.

Application filed September 26, 1884. (No model.)

*To all whom it may concern:*

Be it known that I, MOSES FREAR, of Rosendale, in the county of Ulster and State of New York, have invented certain new and useful Improvements in Running-Gears for Vehicles; and I do hereby declare the following to be a full, clear, and exact description of the invention, such as will enable others skilled in the art to which it pertains to make and use it, reference being had to the accompanying drawings, which form part of this specification.

My invention relates to an improvement in running-gears for vehicles; and it consists in the head-block provided with two leaves, between which the front axle is pivoted, and which is made in a single piece with the front cross-bar, as will be more fully described hereinafter.

The object of my invention is to simplify the running-gear of a vehicle by combining the reach and head-block in a single piece, of metal or wood, and by doing away with the use of a fifth-wheel.

In the accompanying drawings, Figure 1 is a perspective of my invention, showing the reach, the head-block, the axles, and the spring-bars; and Fig. 2 is a side elevation of a buggy to which my invention is applied. Fig. 3 is a detached view showing the head-block and the reach. Fig. 4 is a perspective of the head-block and cross-bar detached.

A represents a reach, which is composed of the side bars, B, and the transverse bar C, which connects them at their front ends. From the front of the bar C, at its center, projects forwardly a head-block, D, which is formed integrally with the reach. This head-block rises a suitable distance above the bar C, and consists of the upper plate, E, and the lower plate, F. These plates serve the purpose of the ordinary fifth-wheel. In between these plates is pivoted the front axle by means of a pivotal bolt, G. The rear ends of the bars B are secured to the rear axle on its under side, and the bars are braced into position against side strain by means of the rods H, which extend diagonally from the bars B, near their rear ends, to the outer ends of the rear axle, as shown in Fig. 1. On the under side of the bars B are secured transverse bars I, to which the springs are adapted to be applied, as shown in Fig. 2. Any desired curve may be given to the bars B, a preferable form of curve being shown in the accompanying drawings, though this may be modified or varied at will.

A running-gear thus constructed is exceedingly light, cheap, and strong, as well as elegant in appearance.

Having thus described my invention, I claim—

1. The head-block D, provided with the plates E F, and made in a single piece with the cross-bar C, substantially as set forth.

2. The combination of the bars B C, head-block D, having the upper and lower plates, E F, and the front axle, which is pivoted between the plates, substantially as shown.

In testimony whereof I affix my signature in presence of two witnesses.

MOSES FREAR.

Witnesses:
FREDERICK KEMPER,
JOSEPH E. MARVIN.